United States Patent
Takahashi

(10) Patent No.: US 8,155,292 B2
(45) Date of Patent: Apr. 10, 2012

(54) TELEPHONE SYSTEM AND SERVER APPARATUS

(75) Inventor: Makoto Takahashi, Hino (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1113 days.

(21) Appl. No.: 12/019,261

(22) Filed: Jan. 24, 2008

(65) Prior Publication Data

US 2008/0181370 A1    Jul. 31, 2008

(30) Foreign Application Priority Data

Jan. 31, 2007   (JP) ................. 2007-021195

(51) Int. Cl.
*H04M 1/00*   (2006.01)
*H04M 7/00*   (2006.01)
*H04M 3/00*   (2006.01)
*H04M 5/00*   (2006.01)

(52) U.S. Cl. ............. 379/165; 379/225; 379/265.02

(58) Field of Classification Search .......... 379/156, 379/164, 165, 166, 207.04, 207.13, 211.01, 379/211.02, 212.01, 221.01, 265.01, 265.02, 379/265.03, 309, 225
See application file for complete search history.

(56) References Cited

U.S. PATENT DOCUMENTS

| | | | |
|---|---|---|---|
| 6,750,897 B1 * | 6/2004 | Moshrefi et al. | 348/14.08 |
| 2004/0239754 A1 * | 12/2004 | Shachar et al. | 348/14.08 |
| 2006/0215637 A1 * | 9/2006 | Fukazawa et al. | 370/352 |

FOREIGN PATENT DOCUMENTS

| | | |
|---|---|---|
| JP | 06-334754 | 12/1994 |
| JP | 2001-119735 | 4/2001 |
| JP | 2001-244930 | 9/2001 |

* cited by examiner

*Primary Examiner* — Binh Tieu
(74) *Attorney, Agent, or Firm* — Pillsbury Winthrop Shaw Pittman, LLP

(57) ABSTRACT

According to one embodiment, a telephone system includes a plurality of telephone exchange apparatuses generate call information events specifying a plurality of telephone terminals to which call connections are made, a server apparatus which is connected to the plurality of telephone exchange apparatuses through the transmission paths, and a management unit executes call-state management of the plurality of telephone terminals, wherein each of the plurality of telephone exchange apparatuses include a determining unit which determines presence or absence of disconnections of call connections among the plurality of telephone exchange apparatuses and a transmitter which adds identification information to the call information event to be transmitted to the server apparatus, and the server apparatus includes a controller which controls execution and stop of the call-state management by the management unit based on the identification information, when the identification information is added to the received call information event.

4 Claims, 4 Drawing Sheets

TELEPHONE SYSTEM AND SERVER APPARATUS

CROSS-REFERENCE TO RELATED APPLICATIONS

This application is based upon and claims the benefit of priority from Japanese Patent Application No. 2007-021195, filed Jan. 31, 2007, the entire contents of which are incorporated herein by reference.

BACKGROUND

1. Field

One embodiment of the present invention relates to a telephone system and a server apparatus which manages operations for a plurality of telephone exchange apparatuses connected with one another via an Internet Protocol (IP) network by using a server apparatus via the IP network.

2. Description of the Related Art

In recent years, an IP telephone system which interactively transmits and receives in real time images and voice as packet data has become widely used. This IP telephone system may perform inter-extension communication and the outside line originating and incoming calls for each telephone exchange apparatus to be connected to the IP network perform and also may perform extension communication and outside line outgoing and incoming calls among the telephone exchange apparatus via the IP network.

Meanwhile, also in the IP telephone system, to achieve a system with high function, computer telephony integration (CTI) is a possible approach. The CTI connects a server apparatus such as a personal computer to each telephone exchange apparatus via the IP network, makes the server apparatus perform a part of exchange processing of each telephone exchange apparatus and store and process voice and data, and may achieve an IP telephone system with a high function without having to enhance a processing function of each telephone exchange apparatus. The server apparatus has a function of providing an auto call distribution (ACD) service.

The ACD service configures one ACD group by including a plurality of extension terminals or a plurality of telephone exchange apparatuses, evenly distributes incoming calls from the outside line to the extension terminals within the ACD group, and then, may efficiently process the incoming calls by preventing concentration of incoming on a specified extension terminal.

In addition, regarding the foregoing system, a method for monitoring a process situation provided by the ACD service so as to assist, for example, call process work of a recipient (an Agent) in the ACD group, and to manage an operation state of the system has been strongly desired. Conventionally, a system is proposed, which connects a plurality of telephone exchange apparatuses to a computer through communication paths, manages extension member terminals as virtual terminals, bring the states of the virtual terminals into use states only when all the member terminals become in-use, and each telephone exchange apparatus notifies the state changes in the virtual terminals to the computer as needed (e.g., Jpn. Pat. Appln. KOKAI Publication No. 6-334754).

However, in the aforementioned system, the telephone terminals connected to the telephone exchange apparatuses differing from one another on the IP network are brought into talk states among themselves, and then, if the talk states are changed, an ACD application software in the server apparatus also has to perform call-state management such as relay connection and disconnection on the IP network, and a process load on the call-state management by the ACD application software becomes severe.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings, in general, according to one embodiment of the invention, a telephone system comprising: a plurality of telephone exchange apparatuses which are connected with one another via transmission paths and execute exchange processing among a plurality of telephone terminals, generate call information events specifying a plurality of telephone terminals to which call connections are made; a server apparatus which is connected to the plurality of telephone exchange apparatuses through the transmission paths; and a management unit which is connected to the server apparatus, receives call information events from the plurality of telephone exchange apparatuses, and executes call-state management of the plurality of telephone terminals, wherein each of the plurality of telephone exchange apparatuses comprises: a determining unit which determines presence or absence of disconnections of call connections among the plurality of telephone exchange apparatuses, when call connection states are changed in a state in which call connections among the plurality of telephone terminals connected to the telephone exchange apparatuses differing from one another are established; and a transmitter which adds identification information to the call information event to be transmitted to the server apparatus, when the determining unit determines that the fact of the disconnection of the call connections, the identification information indicating the fact of disconnections of the call connections, and the server apparatus comprises: a controller which controls execution and stop of the call-state management by the management unit based on the identification information, when the identification information is added to the received call information event.

(First Embodiment)

Figure 1:
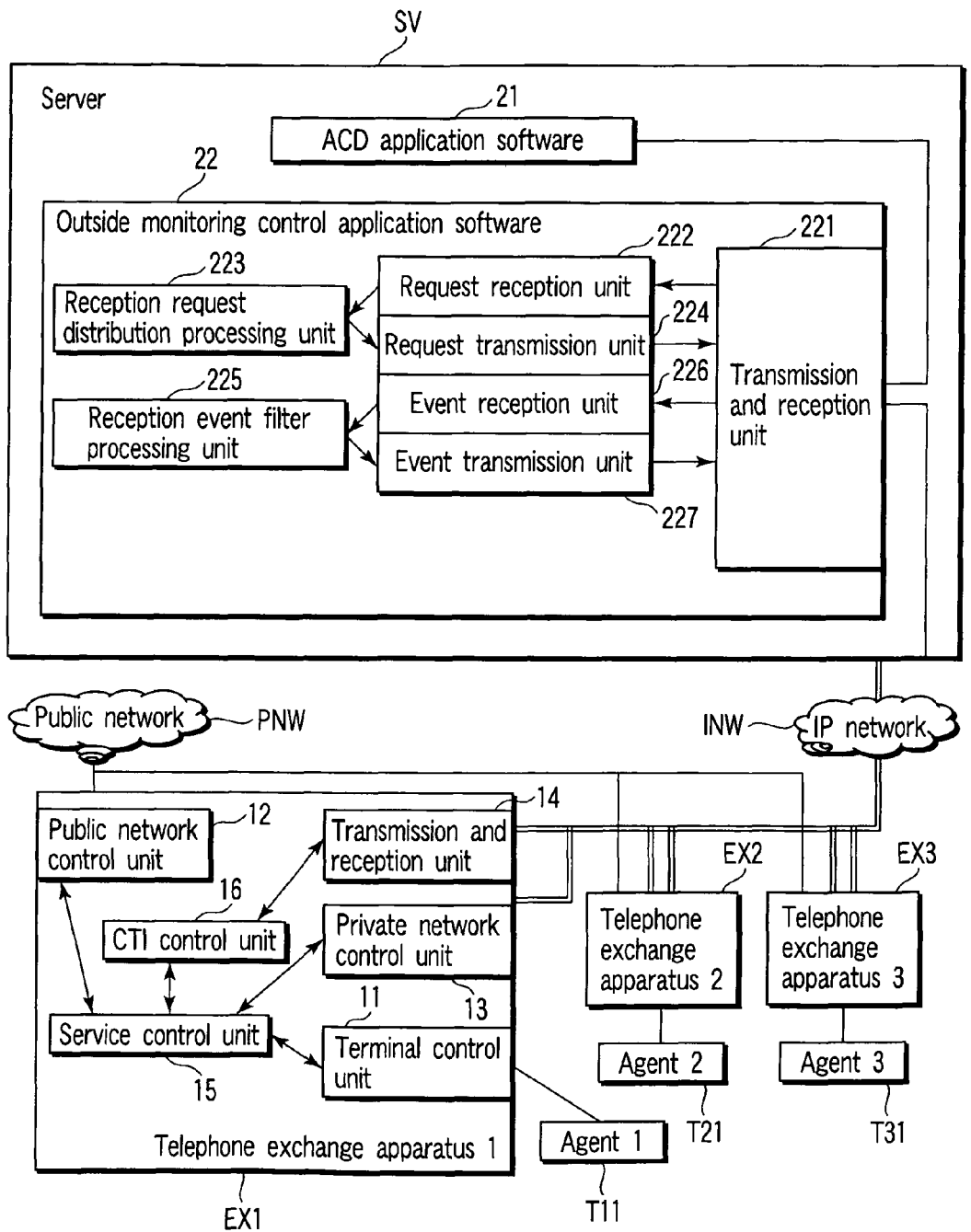
FIG. 1 is a schematic configuration view depicting a first embodiment of a telephone system regarding the present invention.

FIG. 1 is a schematic configuration view illustrating the first embodiment of a telephone system regarding the invention.

The system includes an IP private network INW. A plurality of telephone exchange apparatuses EX1-EX3 are connected to the IP private network INW. A server SV is connected to the IP private network INW.

Each of terminals T11, T21 and T31 is connected the plurality of telephone exchange apparatuses EX1-EX3, respectively. Each of the terminals T11, T21 and T31 uses an IP telephone terminal with a call processing function and a media information processing function or uses a software-phone realized by software on a personal computer. Further, the telephone exchange apparatuses EX1-EX3 are connected to a public network PNW.

Each of the plurality of telephone exchange apparatuses EX1-EX3 includes a terminal control unit 11, a public network control unit 12 (hereinafter, referred to as a control unit 12), an private network control unit 13 (hereinafter, referred to as a control unit 13), a transmission and reception unit 14, a service control unit 15 and a CTI control unit 16. Here, the telephone exchange apparatus EX1 will be described as a representative.

The control unit 11 houses the terminal T11. The control unit 11 conducts outgoing and incoming call processing and transfer processing etc., of a digital signal for the terminal T11.

The control unit 12 is connected to the public network PNW and conducts establishment processing of a call to and from the public network PNW.

The control unit 13 is connected to the IP private network INW to conduct establishment processing etc., to and from the IP private network INW.

The transmission and reception unit 14 makes communication with the server SV via the IP private network INW.

The service control unit 15 has a usual function such as outgoing processing accompanied by a call request from the terminal T11 and usual incoming call processing accompanied by outside line incoming call from the public network PNW.

The CTI control unit 16 has a function of performing transfer processing of a digital voice signal between the server SV and the terminal T11 through the transmission and reception unit 14, and a function of performing transfer processing of a control command etc., between the service control unit 15 and the server SV.

The server SV includes an ACD application software 21 and outside monitoring control application software 22 (hereinafter, referred to as control application software 22). The ACD application software 21 receives a call information event, specifying each terminal T11, T21 and T31 to which call connections are made, from the telephone exchange apparatuses EX1-EX3, respectively, and executes call-state management of each terminal T11, T21 and T31, in addition to a usual ACD service.

When receiving a call-state change notification event with identification information about the disconnection of the IP private network INW added thereto from the telephone exchange apparatuses EX1-EX3, the control application software 22 controls execution and stop of call-state management by means of the ACD application software 21 based on the identification information.

Next to this, operations of the system configured as mentioned above will be described.

Figure 2:
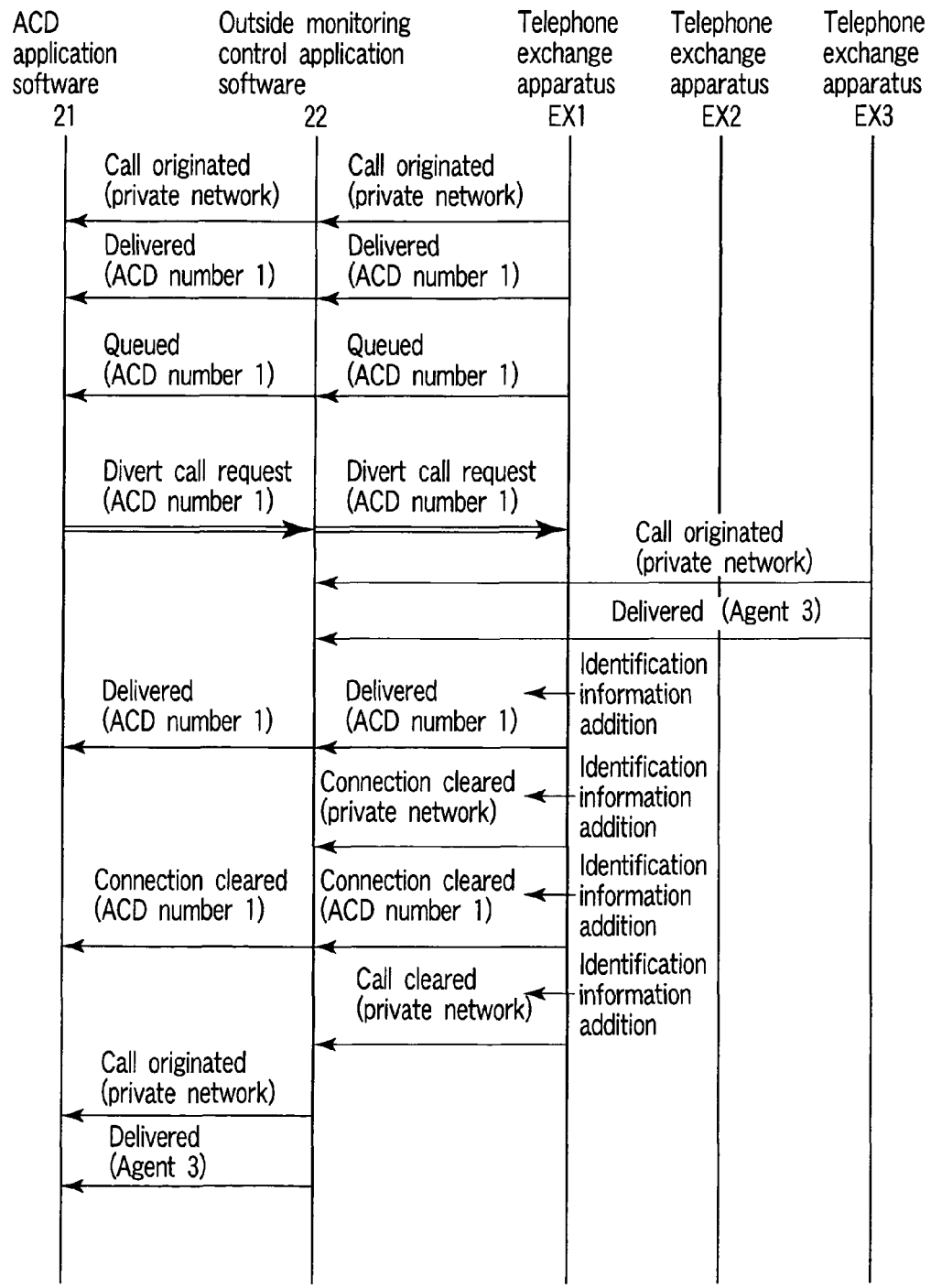
FIG. 2 is a sequence view depicting transmission and reception operations among telephone exchange apparatuses, ACD application software, and outside monitoring control application in providing an ACD service, in the first embodiment of the invention.

FIG. 2 is a sequence view illustrating transmission and reception operations of information among the telephone exchange apparatuses EX1-EX3, the ACD application software 21 and the control application software 22 in executing the ACD.

For instance, an incoming call is generated to the telephone exchange apparatus EX2 from the public network PNW, and it arrives at an ACD number 1 that is an identification number assigned so as to make the ACD application software 21 distribute the incoming call in the telephone exchange apparatus EX1 via the IP private network INW. At this moment, the telephone exchange apparatus EX1 requests for generation of a call to the service control unit 15 by an input from the control unit 13.

The service control unit 15 originates a new call to the ACD number 1, transfers information originated the new call to the CTI control unit 16 and then the CTI control unit 16 transmits a call originated event to the control application software 22 via the transmission and reception unit 14. Similarly, the CTI control unit 16 transmits a delivered event of information which has arrived at the ACD number 1 and a queued event of information which has brought about incoming call queuing to the control application software 22.

The control application software 22 which has received a divert call request from the ACD application software 21 through a transmission and reception unit 221 and a request reception unit 222 decides a reception request distribution by a reception request distribution processing unit 223. For instance, if the control application software 22 decides the incoming call distribution to the terminal T31 of the telephone exchange apparatus EX3, a request transmission unit 224 transmits the divert call request to the terminal T31 toward the telephone exchange apparatus EX3 via the transmission and reception unit 221.

Although a connection form of the IP private network INW between the telephone exchange apparatuses at this moment has become a connection from the telephone exchange apparatus EX2 to the telephone exchange apparatus EX3 by relaying the telephone exchange apparatus EX1, when the telephone exchange apparatus EX2 receives a call destination change notification to be transmitted from the telephone exchange apparatus EX1 through the control unit 13, the service control unit 15 determines whether or not the incoming call may be received at the terminal T31 of the telephone exchange apparatus EX3.

If the incoming call may be received at the terminal (Agent 3) T31 of the telephone exchange apparatus EX3, the service control unit 15 transmits call destination change success and disconnection request to the telephone exchange apparatus EX1 through the control unit 13. The service control unit 15 then disconnects the telephone exchange apparatus EX1 being in relay and connects the telephone exchange apparatuses EX2 to the telephone exchange apparatus EX3.

When disconnecting the telephone exchange apparatus EX1 being in relay as given above, by disconnecting the IP private network connection between the telephone exchange apparatus EX2 and the telephone exchange apparatus EX1, call-state changes in IP exclusive connections are generated at the telephone exchange apparatuses EX2 and EX1, respectively, and the call-state change notification events are generated. However, these notification events become unnecessary for the management of calls by the ACD application software 21.

Figure 3:
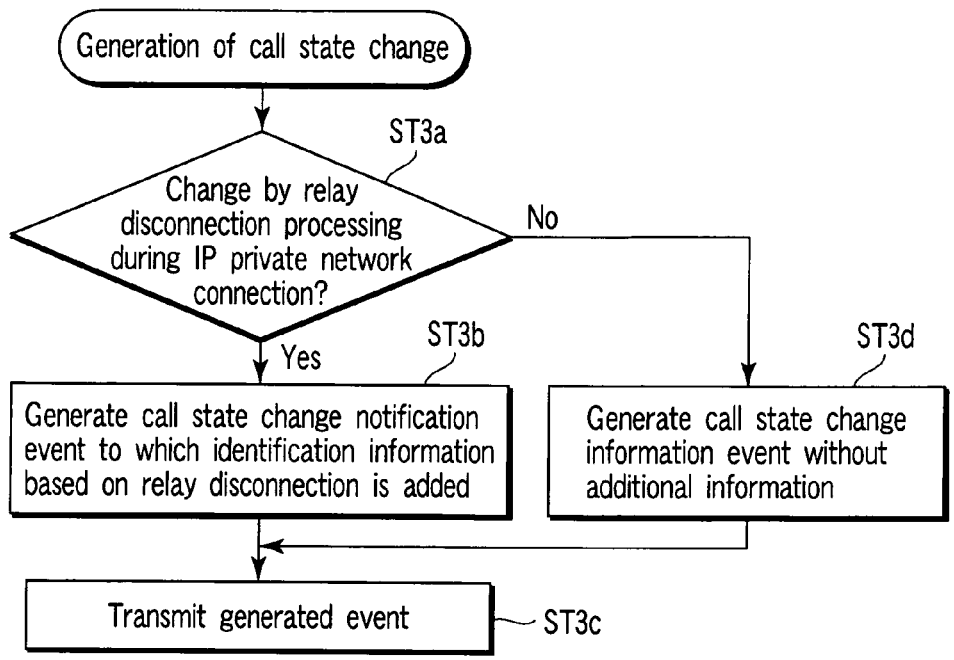
FIG. 3 is a flowchart depicting a control processing procedure of CTI control units of the telephone exchange apparatuses in the first embodiment of the invention.

Therefore, in the first embodiment of the invention, the CTI control unit 16 executes the control processing shown in FIG. 3.

The CTI control unit 16 determines whether or not the call-state has been changed through the relay disconnection processing during connection of the IP private network (block ST3*a*). If the CTI control unit 16 determines that the call-state has been changed by the relay disconnection processing during the connection of the IP private network (YES), the CTI control unit 16 generates a call-state change notification event to which information, being identifiable that the call state changes has been caused by the relay disconnection, is added (block ST3*b*) to transmit it to the control application software 22 (block ST3*c*).

On the contrary, if the CTI control unit 16 determines that the call state changes has not been caused by the relay disconnection during connection of the IP private network (NO), the CTI control unit 16 generates the known call-state change notification event to transmit it to the control application software 22 (block ST3*d*).

Figure 4:
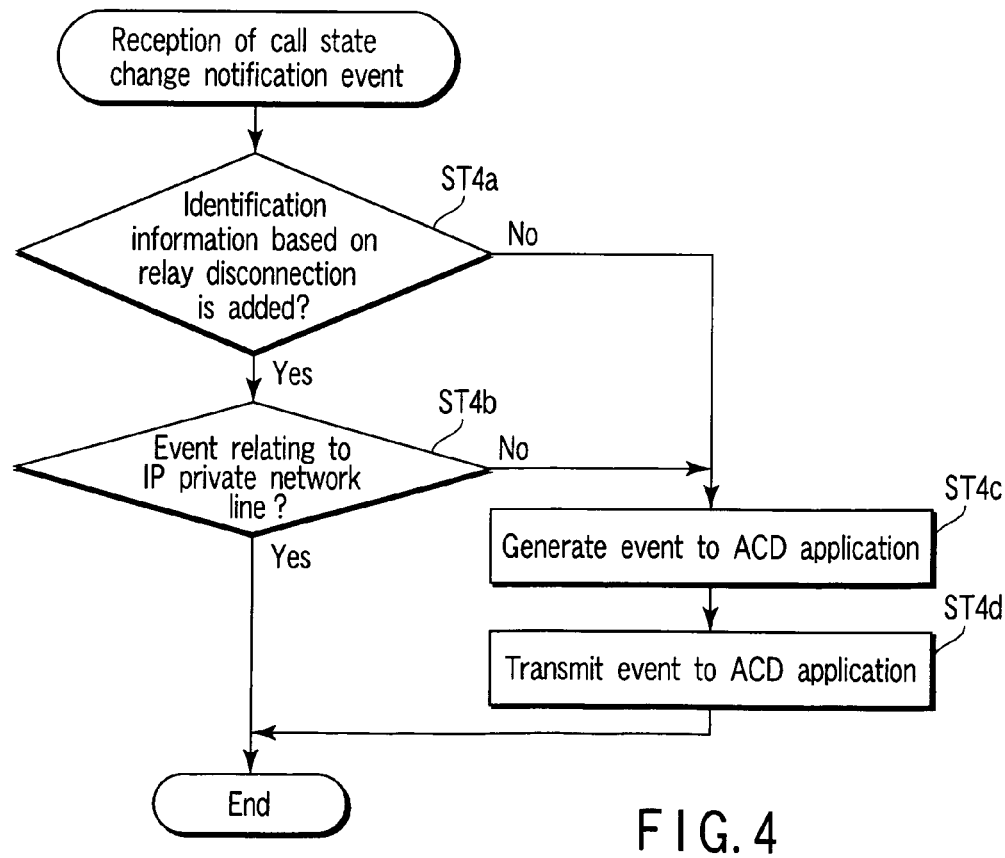
FIG. 4 is a flowchart depicting a control processing procedure of the outside monitoring control application software of a server in the first embodiment of the invention.

In contrast, the control application software 22 implements the control processing depicted in FIG. 4.

In the control application software 22, a reception event filter processing unit 225 (hereinafter, referred to as a filter processing unit 225) determines whether or not the identification information caused by the relay disconnection is added to the received call-state change notification event from event reception unit 226 (block 4*a*). If the identification information is added (YES), the control application software 22 determines whether or not the call-state change notification event is related to the IP private network INW (block ST4*b*).

Here, if the control application software 22 determines that the notification event is related to the IP private network INW (YES), the control application software 22 does not conduct event generation processing and event transmission processing to the ACD application software 21.

Meanwhile, if the identification information is determined of not being added in block ST4*a* or the identification information is determined of not being related to the IP private network INW in block ST4*b*, the control application software 22 executes event generation processing for the ACD application software 21 (block ST4*c*) and executes event transmission processing by a event transmission unit 227 (block ST4*d*).

Thus, although an incoming call destination change event of the ACD number 1 with the identification information caused by the relay disconnection added thereto, a connection cleared event of the private network, a connection cleared event of the ACD number 1 and a call cleared event of the private network are transmitted from the telephone exchange apparatus EX1 to the control application software 22, since it is determined that the connection cleared event of the private network and the call deletion event thereof are not transmitted to the ACD application software, events to be transmitted to the ACD application software 21 are become only the diverted event of the ACD number 1 and the connection cleared event thereof.

As given above, in the first embodiment, before the execution of the call state management by the ACD application software 21 in the server SV, in a state in which the call connection is made between the terminals T11 and T21 connected to the telephone exchange apparatuses EX1, EX2 differing from each other, the call-state change notification event to be transmitted from each telephone exchange apparatus EX1, EX2 during disconnection of the relay connection of the IP private network INW is identified by the control application software 22 to apply filtering to the notification event.

Accordingly, the ACD application software 21 may execute call management without being aware of disconnection of the relay connection of the IP private network INW.

Only by adding the identification information during disconnection of the relay connection of the IP private network INW to the call-state change notification event, each telephone exchange apparatus EX1-EX3 makes it possible to share transmission determination of the call-state change notification events by the CTI control unit 16 at each of forms not using and using the control application software 22 by leaving the determination whether the call-state change notification event should be made or not for the control application software 21 in the care of the control application software 22.

(Second Embodiment)

Figure 5:
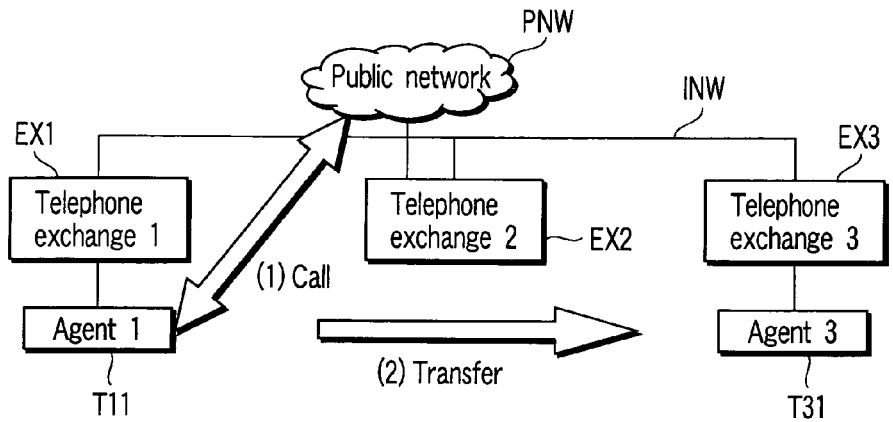
FIG. 5 is a schematic sequence view to explain operations in performing call transfer from talk states among a public network and terminals to other terminals.
Figure 6:
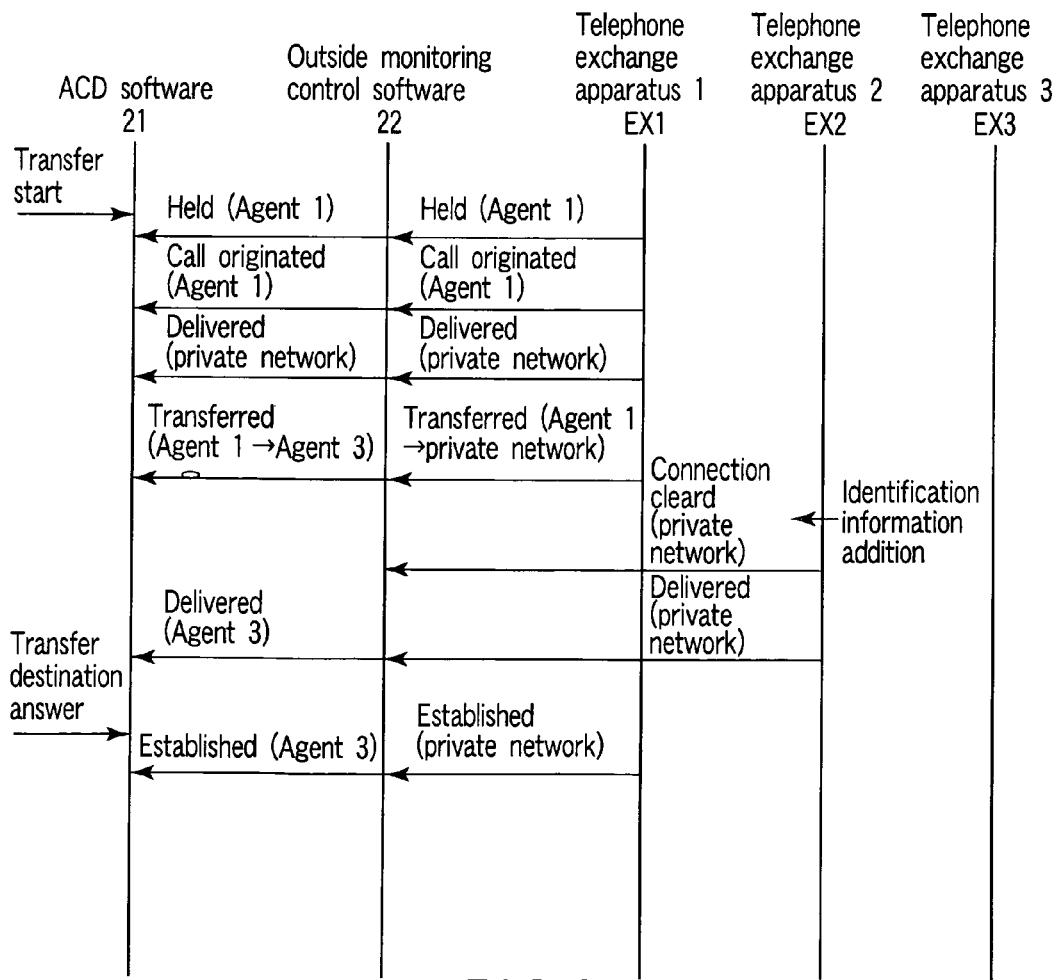
FIG. 6 is a detailed sequence view of FIG. 5.

FIG. 5 shows a schematic sequence view for explaining operations in performing call transfer from a talk state between the public network PNW and the terminal T11 to a talk state of the terminal T31 as the second embodiment of the present invention, and FIG. 6 shows its detailed sequence view.

It is assumed that talk between the terminal T11 and an external terminal (not shown) on the public network PNW [FIG. 5(1)]. In this state, it is assumed that the user of the terminal T11 conducts an operation to require transfer of the call to the terminal T31 (Agent 3) [FIG. 5(2)]. The terminal T11 transmits its request signal from the terminal T11 to the telephone exchange EX1. When receiving the request signal, the telephone exchange apparatus EX1 holds a communication link between the public network PNW and the external terminal to issue an event generation instruction from the service control unit 15 to the CTI control unit 16.

The CTI control unit 16 generates a held event and transmits the held event and a call originated event to the terminal T31 via the transmission and reception unit 14 to the control application software 22.

Meanwhile, when receiving the call destination change information to be transmitted from the telephone exchange apparatus EX1, the telephone exchange apparatus EX2 determines whether or not the incoming call may be received by the terminal T31. If the incoming call may be received by the terminal T31, by transmitting the call destination change success and the disconnection request to the telephone exchange apparatus EX1 through the control unit 13, the telephone exchange apparatus EX2 disconnects the telephone exchange apparatus EX1, and makes a connection with the telephone exchange apparatus EX3.

At this moment, the telephone exchange apparatus EX2 determines that the call-state change is caused by the relay disconnection during connection of the IP private network, and generates the call-state change notification event to which information identifiable of being resulted from the relay disconnection is added and transmits it to the control application software 22.

On the contrary, in the control application software 22, the filter processing unit 225 determines whether or not the identification information due to the relay disconnection is added to the received call-state change notification event. If the identification information is added and related to the IP private network INW, the application software 22 does not perform the event generation processing and event transmission processing for the ACD application software 21.

After this, when the terminal T31 responds to the request from the telephone exchange apparatus EX1, the control application software 22 connects between the terminal T31 and the communication link of the public network PNW being held.

Thus, the communication destination of the external terminal on the public network PNW is switched from the terminal T11 to the terminal T31, and after this, the user of the external terminal may make communication with the user of the terminal T31 uninterruptedly.

As mentioned above, the second embodiment also produces the same operational effects as those of the first embodiment.

(Other Embodiment)

The present invention is not limited to each of the foregoing embodiments. For instance, the invention may be applicable to operations other than the ACD and the call transfer.

Other than this, a system configuration, a functional configuration of a server, types of terminals, a control procedure and its content by an outside monitoring control application software, etc., may be embodied in a variety of modifications without departing from the spirit or scope of the concept of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A telephone system comprising:
a plurality of telephone exchange apparatuses which are connected with one another via transmission paths and execute exchange processing among a plurality of telephone terminals, generate call information events specifying a plurality of telephone terminals to which call connections are made;
a server apparatus which is connected to the plurality of telephone exchange apparatuses through the transmission paths; and
a management unit which is connected to the server apparatus, receives call information events from the plurality of telephone exchange apparatuses, and executes call-state management of the plurality of telephone terminals, wherein
each of the plurality of telephone exchange apparatuses comprises:
a determining unit which determines presence or absence of disconnections of call connections among the plurality of telephone exchange apparatuses, when call connection states are changed in a state in which call connections among the plurality of telephone terminals connected to the telephone exchange apparatuses differing from one another are established; and
a transmitter which adds identification information to the call information event to be transmitted to the server apparatus, when the determining unit determines that the fact of the disconnection of the call connections, the identification information indicating the fact of disconnections of the call connections, and
the server apparatus comprises:
a controller which controls execution and stop of the call-state management by the management unit based on the identification information, when the identification information is added to the received call information event.

2. The telephone system according to claim 1, wherein the controller stops transmission of the call information event to the management unit, when it is determined that the call-state management by the management unit is not necessary from content of the identification information.

3. A server apparatus which receives a call information event from a plurality of telephone exchange apparatuses, the call information event specifying a plurality of telephone terminals to which call connections are made, comprising:
a management unit which executes call-state management of the plurality of telephone terminals based on the call information event;
a receiver which receives the call information event from the telephone exchange apparatuses, in a state in which call connections among the plurality of telephone terminals connected to the telephone exchange apparatuses differing from one another are established;
a filter processing which determines whether or not identification information is added to the received call information event, the identification information indicating the fact of disconnections of the call connections; and,
a controller which controls execution and stop of the call-state management by the management unit based on a determination result by the filter processing unit.

4. The server apparatus according to claim 3, wherein the controller stops transmission of the call information event to the management unit when it is determined that the call-state management by the management unit is not necessary from content of the identification information.

* * * * *